United States Patent
Tetzlaff et al.

(10) Patent No.: US 9,467,275 B2
(45) Date of Patent: Oct. 11, 2016

(54) MAC PROTOCOL FOR FULL DUPLEX WIRELESS COMMUNICATIONS

(71) Applicant: Intel Corporation, Santa Clara, CA (US)

(72) Inventors: Thomas A. Tetzlaff, Portland, OR (US); Robert J. Stacey, Portland, OR (US); Minyoung Park, Portland, OR (US)

(73) Assignee: Intel Corporation, Santa Clara, CA (US)

(*) Notice: Subject to any disclaimer, the term of this patent is extended or adjusted under 35 U.S.C. 154(b) by 158 days.

(21) Appl. No.: 14/335,368

(22) Filed: Jul. 18, 2014

(65) Prior Publication Data

US 2016/0021669 A1 Jan. 21, 2016

(51) Int. Cl.
*H04B 7/005* (2006.01)
*H04L 5/14* (2006.01)
*H04L 1/00* (2006.01)
*H04W 74/08* (2009.01)

(52) U.S. Cl.
CPC . *H04L 5/14* (2013.01); *H04L 1/00* (2013.01); *H04L 5/1461* (2013.01); *H04W 74/0816* (2013.01)

(58) Field of Classification Search
None
See application file for complete search history.

(56) References Cited

U.S. PATENT DOCUMENTS

| | | | | |
|---|---|---|---|---|
| 8,385,288 B2* | 2/2013 | Sridhara et al. | | 370/330 |
| 8,917,647 B2* | 12/2014 | Nentwig | | 370/312 |
| 2004/0196801 A1* | 10/2004 | Hiramatsu | | 370/328 |
| 2005/0180357 A1* | 8/2005 | Tao et al. | | 370/329 |
| 2005/0181832 A1* | 8/2005 | Ishii et al. | | 455/562.1 |
| 2006/0240780 A1* | 10/2006 | Zhu et al. | | 455/63.4 |
| 2008/0008126 A1* | 1/2008 | Shirakabe et al. | | 370/329 |
| 2008/0062896 A1* | 3/2008 | Shirakabe et al. | | 370/278 |
| 2009/0083601 A1* | 3/2009 | Gorokhov et al. | | 714/748 |
| 2009/0300453 A1* | 12/2009 | Sahara | | 714/748 |
| 2010/0080173 A1* | 4/2010 | Takagi | | 370/328 |
| 2010/0232324 A1* | 9/2010 | Radunovic et al. | | 370/277 |
| 2010/0322166 A1* | 12/2010 | Sampath et al. | | 370/329 |
| 2011/0002319 A1* | 1/2011 | Husen et al. | | 370/338 |
| 2011/0164507 A1* | 7/2011 | Jeon | | 370/242 |
| 2011/0268094 A1* | 11/2011 | Gong et al. | | 370/338 |
| 2012/0320887 A1* | 12/2012 | Chintalapudi et al. | | 370/338 |
| 2013/0044680 A1* | 2/2013 | Abraham et al. | | 370/328 |
| 2013/0044681 A1* | 2/2013 | Abraham et al. | | 370/328 |
| 2013/0077554 A1* | 3/2013 | Gauvreau et al. | | 370/312 |
| 2015/0016309 A1* | 1/2015 | Fang et al. | | 370/277 |

* cited by examiner

*Primary Examiner* — Steven H Nguyen
(74) *Attorney, Agent, or Firm* — Schwegman Lundberg & Woessner, P.A.

(57) ABSTRACT

Disclosed in some examples are systems, methods, and machine readable mediums which allow for the deployment of advanced radios which are capable of simultaneous transmission and reception on the same frequency in existing wireless networks, while maintaining backward compatibility with older devices.

28 Claims, 10 Drawing Sheets

MAC PROTOCOL FOR FULL DUPLEX WIRELESS COMMUNICATIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

TECHNICAL FIELD

Embodiments pertain to wireless communications. Some embodiments relate to Medium Access Control (MAC) protocols of wireless communications.

BACKGROUND

Wireless communications are currently only half-duplex, that is, each wireless device can transmit data and receive data, but not at the same time and on the same frequency. This is because transmissions from the wireless device significantly overwhelm any signals received at the wireless devices which are sent from other wireless devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Recent technological developments in echo cancellation allow a wireless device to minimize the impact of its own transmitted signal on a signal received from another wireless device. These developments allow for implementing wireless networks which transmit and receive at the same time and on the same frequency.

Echo cancellation, also known as self-interference cancellation, is the process of removing a device's transmitted signal from the same device's receiver. This is done to allow a device to simultaneously transmit and receive on the same frequency channel, which is referred to as full-duplex operation. The suppression methods of self-interference inside the transceiver can be grouped into 3 categories: Antenna-based solutions, Active analog/RF cancellation, and Digital baseband cancellation.

Antenna-base solutions include use of circulators to isolate Tx and Rx paths (single antenna designs), physical separation and electormagnetic isolation of Tx and Rx antennas (multiple antenna designs), and use of signal splitting and multiple antennas to null the transmitted signal at the receive antenna.

Analog cancellation generally involves attenuating the final transmit signal, processing it, and subtracting it at the receiver. Other transmitter sample points can be used, however non-idealities such as power amplifier (PA) non-linearity would limit the cancellation if the sample point is prior to the PA.

Digital baseband cancellation involves taking transmitted signal information and digitally subtracting it in the receiver after analog-to-digital conversion (ADC). Purely linear techniques using a baseband version of the transmitted signal can provide a limited amount of cancellation. By accounting for non-linearities (for example, phase noise and IQ mismatch), a higher level of suppression can be achieved. In addition, the dynamic range of the ADC must be sufficient to leave a sufficient desired signal after cancellation of the transmitted signal.

In some examples, in order to achieve a high level of self-interference cancellation (aka echo cancellation), all three categories of suppression methods may be implemented on a wireless device.

These echo cancellation techniques may require training to achieve optimum results. For analog/RF and digital baseband cancellation, various parameters are calculated (delay values, tap values, and the like) in order to maximize the amount of cancellation. These parameters take a short amount of time to calculate and will likely vary over time. Therefore, it is desired to have a period in which only the transmitted signal is processed, with no simultaneous received signal, so that the cancellation algorithms can operate and obtain the parameter values. This is referred to as a training period. After the training period, the echo cancellation is operating well, and full duplex operation can proceed.

Despite these advances, many existing wireless networks are not designed for this new technology. These wireless standards designed their wireless medium access rules based upon half-duplex concepts by separating uplink and downlink transmissions based upon time or frequency. For example, networks operating in accordance with an Institute for Electronics and Electrical Engineers (IEEE) 802.11 family of standards (e.g., 802.11-2012 published March 2012) operate based upon the assumption that wireless devices transmit at different times than they receive. Indeed, the 802.11 MAC layer includes the concept of a Short Interframe Space (SIFS) to accommodate the time needed for a wireless device to switch from reception to transmission or vice versa.

In order to accommodate full duplex operation, changes need to be made to these wireless standards. In particular, the MAC layer of the 802.11 network may need modification to support this new full-duplex mode. The Medium Access and Control (MAC) layer of the 802.11 family of standards defines rules for accessing the wireless medium, including coordination of when a device (e.g., a station (STA) or Access Point (AP)) may transmit and when it may receive. Complicating matters is that any change to the MAC layer should preferably be backward compatible with devices which are not capable of supporting full-duplex mode.

Disclosed in some examples are systems, methods, and machine readable mediums which allow for the deployment of advanced radios which are capable of simultaneous transmission and reception on the same frequency in existing wireless networks, while maintaining backward compatibility with older devices. In some examples the MAC layer is modified to allow for simultaneous transmissions and receptions between two or more wireless devices. The MAC layer may be modified to allow for the wireless devices to frequently train their radio's echo cancelers so as to accurately reduce the noise caused in the receive circuitry of the wireless device by a transmission of the transmission circuitry in the wireless device. In some examples, the MAC layer may also be modified to advantageously utilize the full duplex nature of the connection by sending acknowledgements for data previously received simultaneous with reception of new data.

In some examples, a wireless medium reservation message, such as a Request to Send (RTS) message and a confirmation message of the wireless reservation message, such as a Clear to Send (CTS) message may allow the communicating wireless devices to train their echo cancelers. The RTS and CTS messages are specified by the 802.11 standards for reserving the wireless medium. The RTS message is sent by a first one of the two communicating wireless devices (hereinafter the "initiating device") and is acknowledged by a CTS message by the second one of the two communicating devices (hereinafter the "responding device"). The RTS frame carries a duration value which covers the CTS response plus the time needed for the subsequent data exchange. The CTS response includes a duration field which may be set to the duration field value seen in the RTS less both the SIFS period and the duration of the CTS response itself. Other devices in the wireless network which hear one or both of these messages will refrain from transmitting based upon the duration values specified in these messages. The initiating device (the device sending the RTS message) may train its echo canceler based upon the signal detected by its own receive circuitry during the RTS transmission and likewise the responding device (the device sending the CTS message) may train its own echo canceler based upon the signal detected by the receive circuitry during the CTS transmission.

Figure 1:
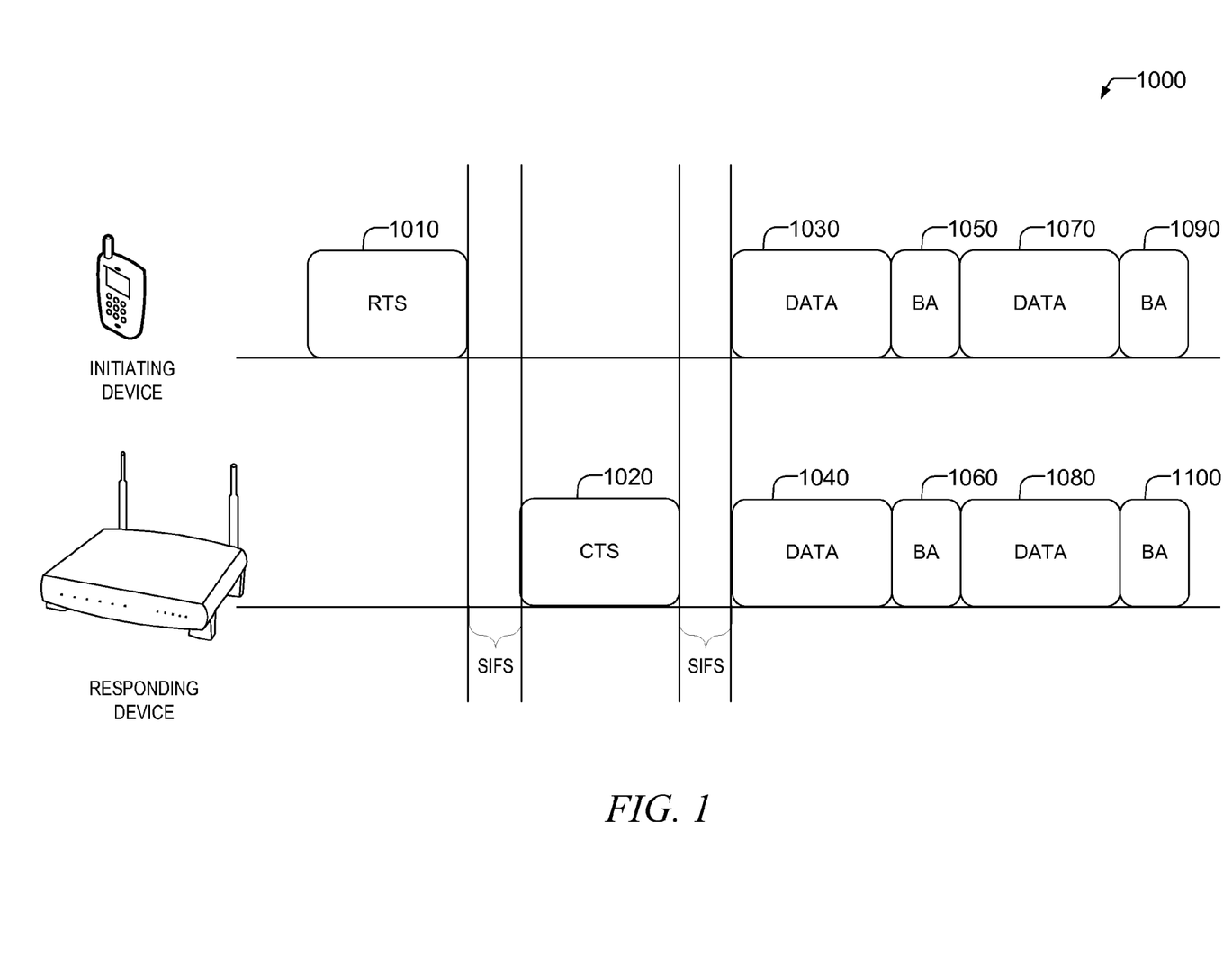
FIG. 1 shows a message sequence diagram of a full-duplex exchange according to some examples of the present disclosure.

Once the data exchange period begins, both devices may thus transmit and receive simultaneously. Devices may signal their capabilities to engage in full-duplex transmissions through prior signaling. For example, devices may signal their capabilities in one or more fields in a message preamble such as a HT Capabilities field of a Beacon, Probe Response, or other message. FIG. 1 shows a message sequence diagram 1000 of a full-duplex exchange according to some examples of the present disclosure. At 1010 the initiating device (e.g., a STA), may send an RTS packet 1010 over the wireless medium. The initiating device may receive its own transmitted RTS message 1010 in its own receive circuitry and use the received signal to train its own echo cancellation circuitry in order to engage in the later simultaneous transmission. Other wireless devices which overhear the RTS will decode the RTS and set their network allocation vector (NAV) based upon the duration field in the RTS. This prevents other devices from accessing the medium during the full duplex transmission.

After a SIFS period, the responding device (e.g., an AP) may respond with a CTS packet 1020. The CTS packet 1020, sent by the transmission circuitry of the responding device, may also be received by the receive circuitry of the responding device and used by the responding device to train its own echo cancellation circuitry in order to engage in the later simultaneous transmission. The CTS packet 1020 may include a duration which is the same as the duration in the RTS packet minus the first SIFS period and the time necessary to transmit the CTS packet 1020. Once the initiating device receives the CTS packet 1020, the initiating device may begin transmitting data 1030 after a SIFS period from the CTS 1020. At the same time, the responding device may begin transmitting its data 1040.

After a predetermined period (e.g., after a predetermined period of time or predetermined number of packets), the responding device, the initiating device, or both may send one or more block acknowledgements 1050 and 1060 for packets received from the other device. While FIG. 1 shows both devices sending simultaneous block acknowledgements, in other examples they may be sent at different times—for example, the predetermined period for sending the block acknowledgement for the initiating device may be independent of, and different from the predetermined period for sending the block acknowledgement for the responding device. In yet other examples, each device may be utilizing a different Modulation and Coding Scheme (MCS) and thus may be sending data at a different rate and thus each device may reach its predetermined thresholds at different times. Additionally, while block acknowledgements are shown in FIG. 1, acknowledgements may be done on a per packet basis, simultaneous with reception of new packets.

Nonetheless, after an acknowledgement is complete, if the time reserved by the RTS/CTS has not yet expired (e.g., the transmission opportunity or TX-OP) and the initiating device, the responding device, or both have additional data to transmit, they may do so. If they both have data they may do so simultaneously. For example, data 1070 and 1080. Again, block acknowledgments, such as block acknowledgments 1090 and 1100 may be sent after one or more predetermined periods of packet reception by the initiating device, the responding device, or both. Acknowledgements may also be sent upon the conclusion of data transfers (e.g., the device is no longer receiving data from the other device or the transmission opportunity is about to expire).

The acknowledgements may be sent simultaneously, or overlapping with data. For example, FIG. 1 shows simultaneous transmission by both devices of block acknowledgements 1050 and 1060 and also simultaneous transmission of block acknowledgements 1090 and 1100.

Figure 2:
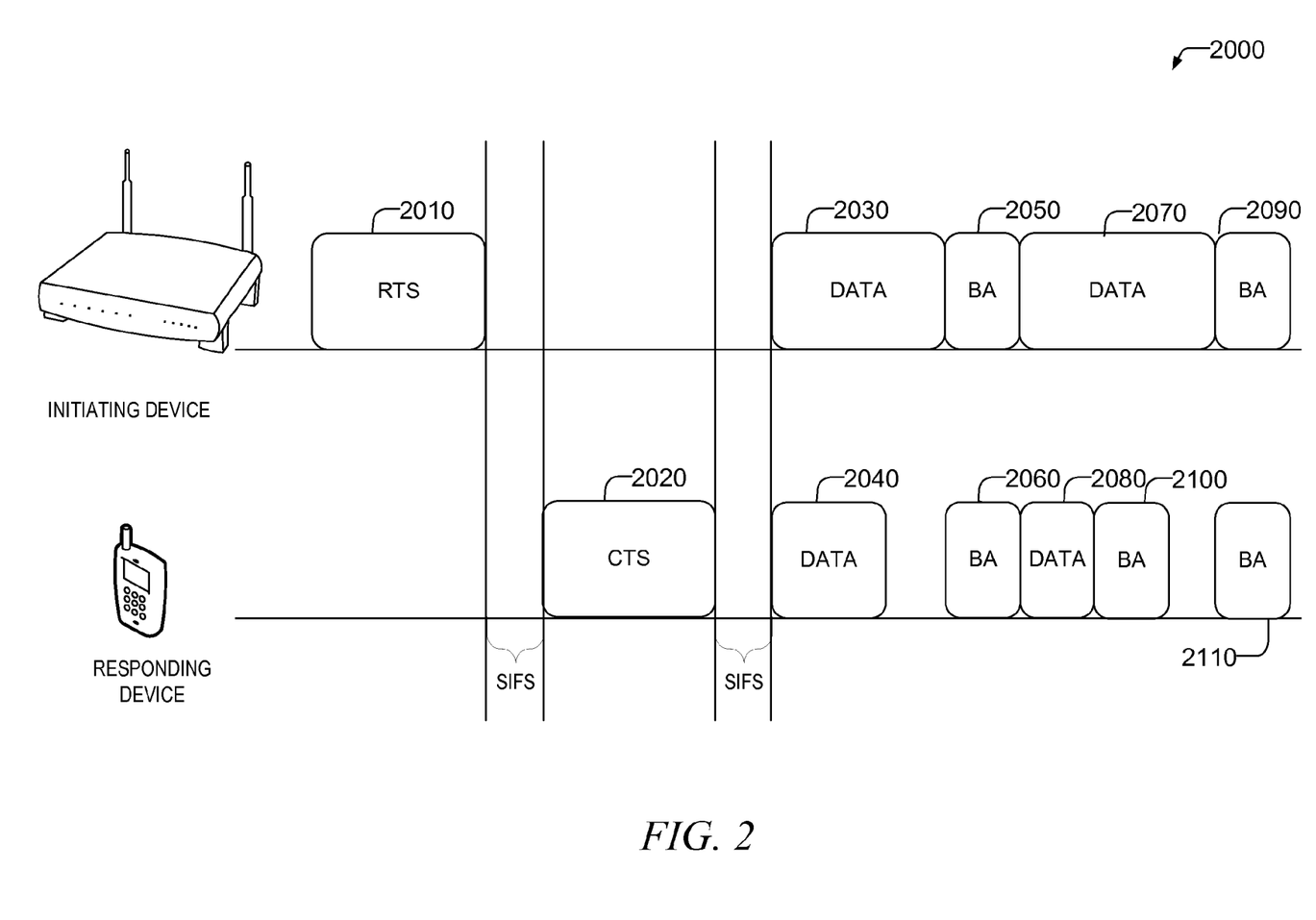
FIG. 2 shows a message sequence diagram of a full-duplex exchange according to some examples of the present disclosure.

FIG. 2 shows another message sequence diagram 2000 of a full-duplex exchange according to some examples of the present disclosure. In the example of FIG. 2, RTS 2010 and CTS 2020 proceed as described in FIG. 1. In FIG. 2, an AP is the initiating device and a STA is a responding device. Data 2030 may be sent by the initiating device and data 2040 may be received at the initiating device from the responding device simultaneously. In the example of FIG. 2, the responding device may finish sending its data prior to the initiating device (e.g., the responding device may have less data to send or may send it at a faster rate). The responding device may wait to send the block acknowledgement 2060 until the predetermined period, which may align with that of the initiating device. According to this example, both the initiating device and the responding device may send block acknowledgements 2050 and 2060 simultaneously. Subsequently, data may arrive from higher level layers (e.g., at an application layer) of the responding device for transmission to the initiating device. Since the transmission opportunity is still active, transmission of this data 2080 may happen simultaneous to the transmission of data 2070 by the initiating device. As shown in FIG. 1, the responding device finishes data transmission 2080 prior to initiating device finishing data transmission 2070. As shown in FIG. 2, and in contrast to the initiating device waiting to send the block acknowledgement as it did for block acknowledgement 2060, the block acknowledgement 2100 may also, in other examples, and as shown for block acknowledgement 2100, be sent immediately following the transmission of the data 2080. This may be done so as to clear the unacknowledged packet list for the initiating device to ensure there are no delays in communicating the data 2070. In these examples, additional acknowledgements, including potentially block acknowledgements may be needed, for example block acknowledgement 2110. Block acknowledgement 2090 from initiating device to the responding device may be sent simultaneously.

Figure 3:
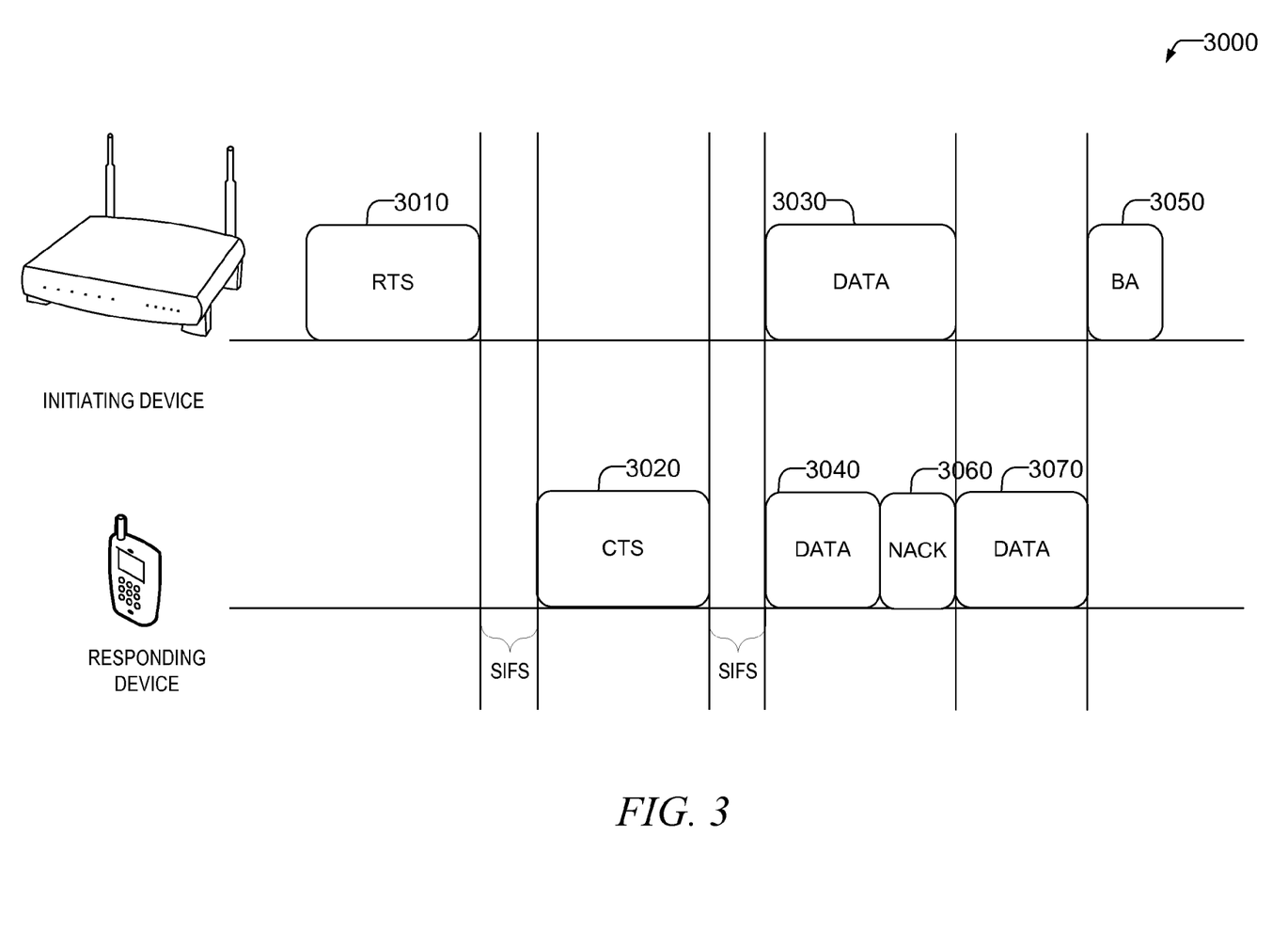
FIG. 3 shows a message sequence diagram of a full-duplex exchange according to some examples of the present disclosure.

FIG. 3 shows another message sequence diagram 3000 of a full-duplex exchange according to some examples of the present disclosure. The RTS and CTS exchange 3010 and 3020 again allow the initiating device and the responding device to train their respective echo cancelers to allow for simultaneous data transmissions. The initiating device transmits data 3030 to the responding device simultaneously with responding device transmitting data 3040 to initiating device. In FIG. 3, the responding device receives one or more packets from data 3030 which contain one or more errors. For example, if a predetermined amount of packets (e.g., a single packet or multiple packets) contain errors, or if an analysis of sequence numbers from subsequently received packets indicates that a packet was not received, than the responding device may send a negative acknowledgement (NACK) 3060. In some examples the NACK message 3060 may specify the packets that were received with errors or were not received at all. The NACK message 3060 may be sent immediately and concurrently with the continued reception of the data 3030 from the initiating device. In other examples, the NACK message 3060 may be sent at the same time as a block acknowledgement would normally be sent.

In the example shown in FIG. 3, the initiating device terminates its transmissions upon reception of the NACK message 3060. The responding device may continue data transmission 3070 and the initiating device may receive this data transmission. In this example, the initiating device may terminate the data transmission 3030 because it may assume that the full duplex connection is not reliable for full-duplex and thus it may downgrade the connection to half-duplex. In other examples, the initiating device may maintain the full-duplex link, but only transmit acknowledgements to data 3070 simultaneously with the reception of data 3070. The initiating device may respond to data 3070 with one or more block acknowledgements 3050.

Figure 4:
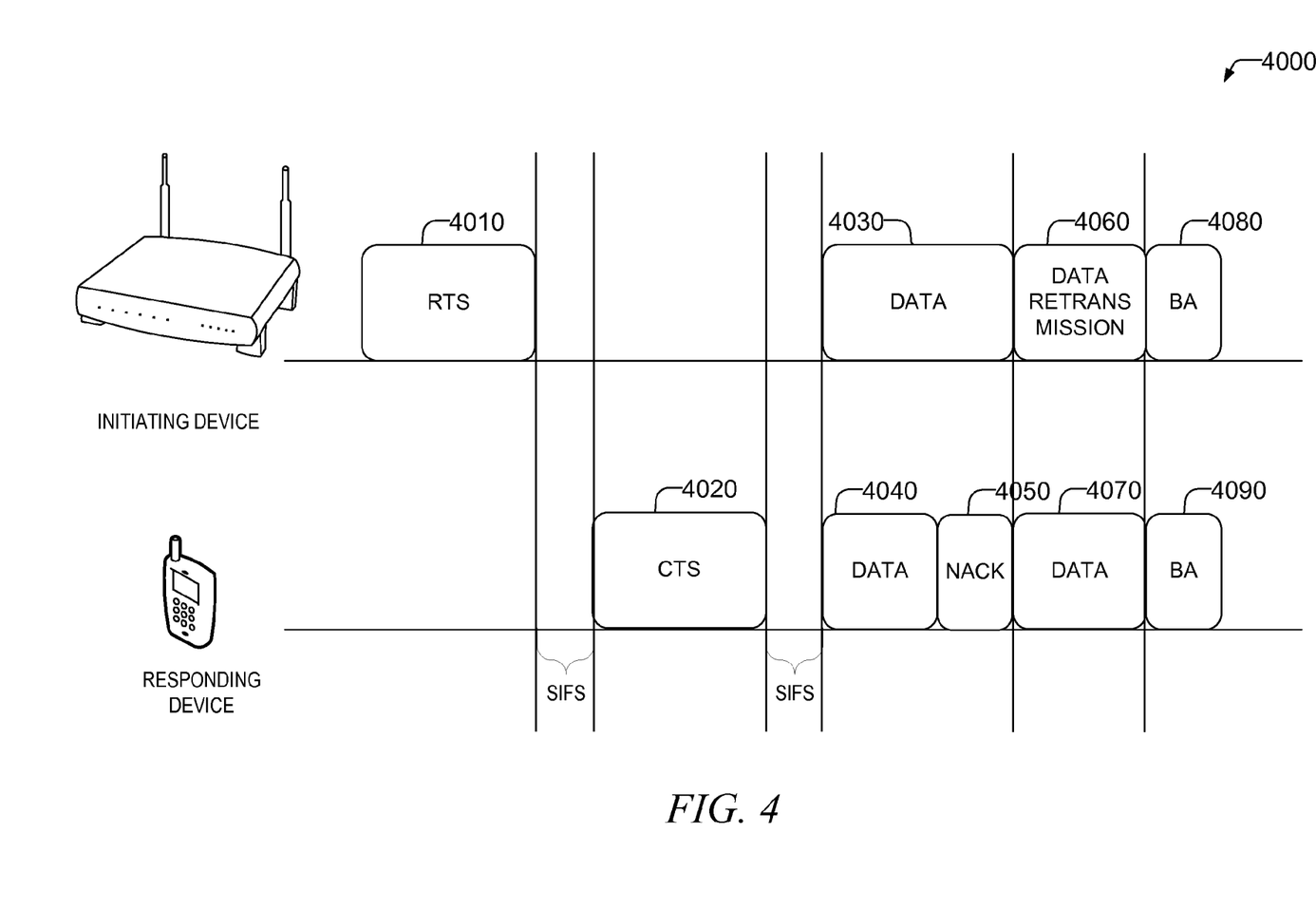
FIG. 4 shows a message sequence diagram of a full-duplex exchange according to some examples of the present disclosure.

FIG. 4 shows another message sequence diagram 4000 of a full-duplex exchange according to some examples of the present disclosure. The RTS and CTS exchange 4010 and 4020 again allows the initiating device and the responding device to train their respective echo cancelers to allow for simultaneous data transmissions (e.g., data transmissions 4030 and 4040). In FIG. 4, the responding device receives one or more packets containing one or more errors. For example, if a predetermined amount of packets (e.g., a single packet or multiple packets) contain errors, or if an analysis of sequence numbers from subsequently received packets indicates that a packet was not received, than the responding device may send a negative acknowledgement (NACK) 4050. In some examples the NACK message 4050 may specify the packets that were received with errors or were not received at all. The NACK message 4050 may be sent immediately and concurrently with the continued reception of the data 4030 from the initiating device. In other examples, the NACK message 4050 may be sent at the same time as a block acknowledgement would normally be sent.

In the example shown in FIG. 4, the initiating device retransmits the NACK'ed data during retransmission 4060 upon reception of the NACK message 4050. In some examples, this retransmission 4060 may be at the same Modulation and Coding Scheme (MCS), but in other examples, this retransmission 4060 may be at a more robust MCS (e.g., an MCS that is more tolerant of interference). The responding device may continue data transmission 4070 (e.g., at the same MCS as data 4040) and the initiating device may receive this data transmission. Block acknowledgements may be sent at 4080 and 4090 respectively.

Figure 5:
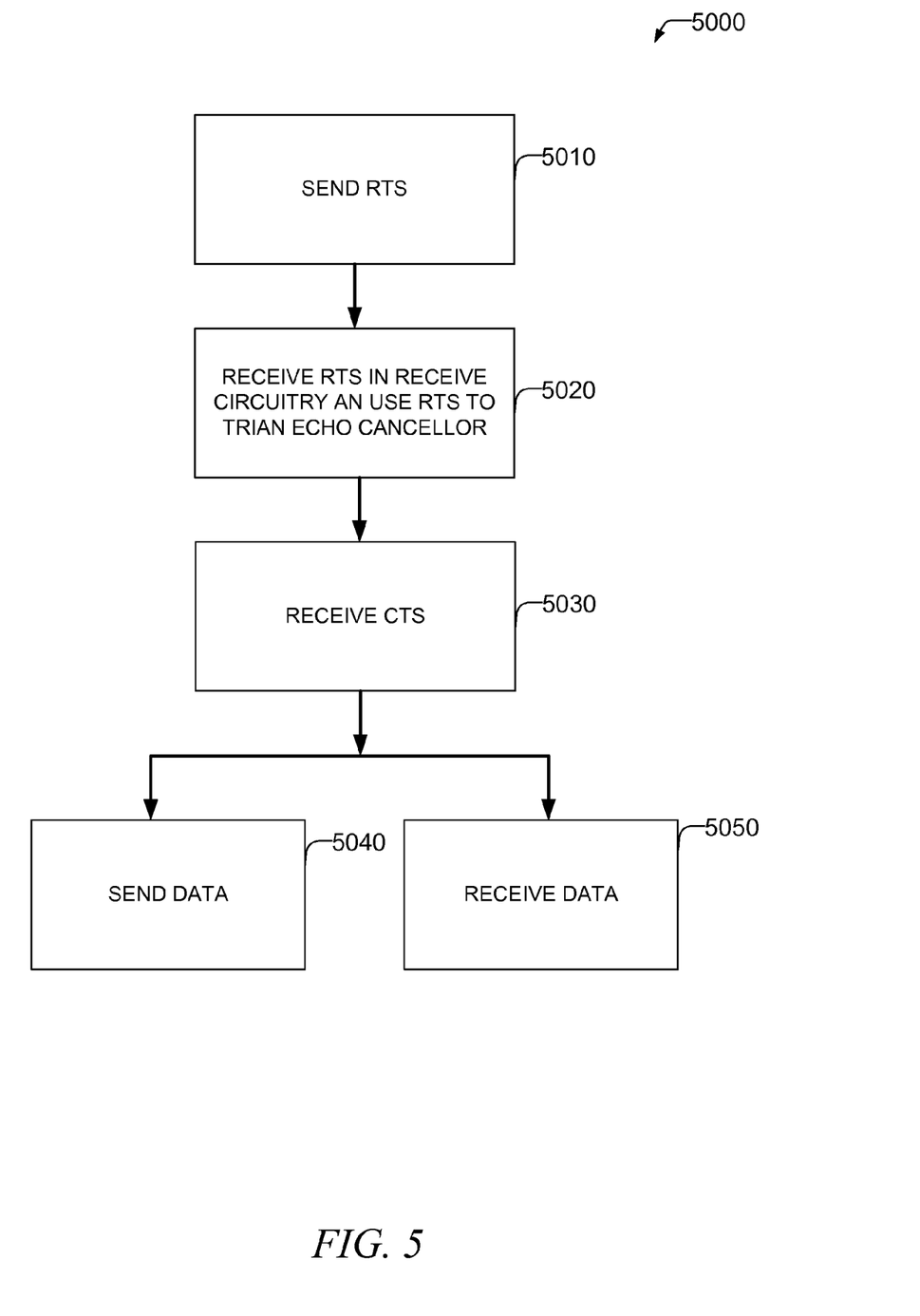
FIG. 5 shows a flowchart of a method of full-duplex communication performed by an initiator device according to some examples of the present disclosure.

Turning now to FIG. 5, a flowchart of a method of full-duplex communication 5000 performed by an initiator device according to some examples of the present disclosure is shown. At operation 5010 the initiator device may send an RTS message. In some examples, prior to sending the RTS message, the initiator device may follow the traditional 802.11 rules for channel access to ensure the channel is free. Example rules may include the Carrier Sense Multiple Access (CSMA) rules. The RTS message may contain a duration field specifying how long the initiator and responder may hold the channel. This defines the transmission opportunity or tx-op. At operation 5020 the RTS message, as heard by the receive circuitry of the initiating device, may be utilized to train the echo canceller in the receive circuitry so the echo canceller may effectively cancel out the contributions of any transmissions of its transmission circuitry to any received signals. At operation 5030 the receive circuitry may receive the CTS message from the responding device. Sending data 5040 and receiving data 5050 may then happen concurrently while the transmission opportunity defined by the RTS message is still active.

Figure 6:
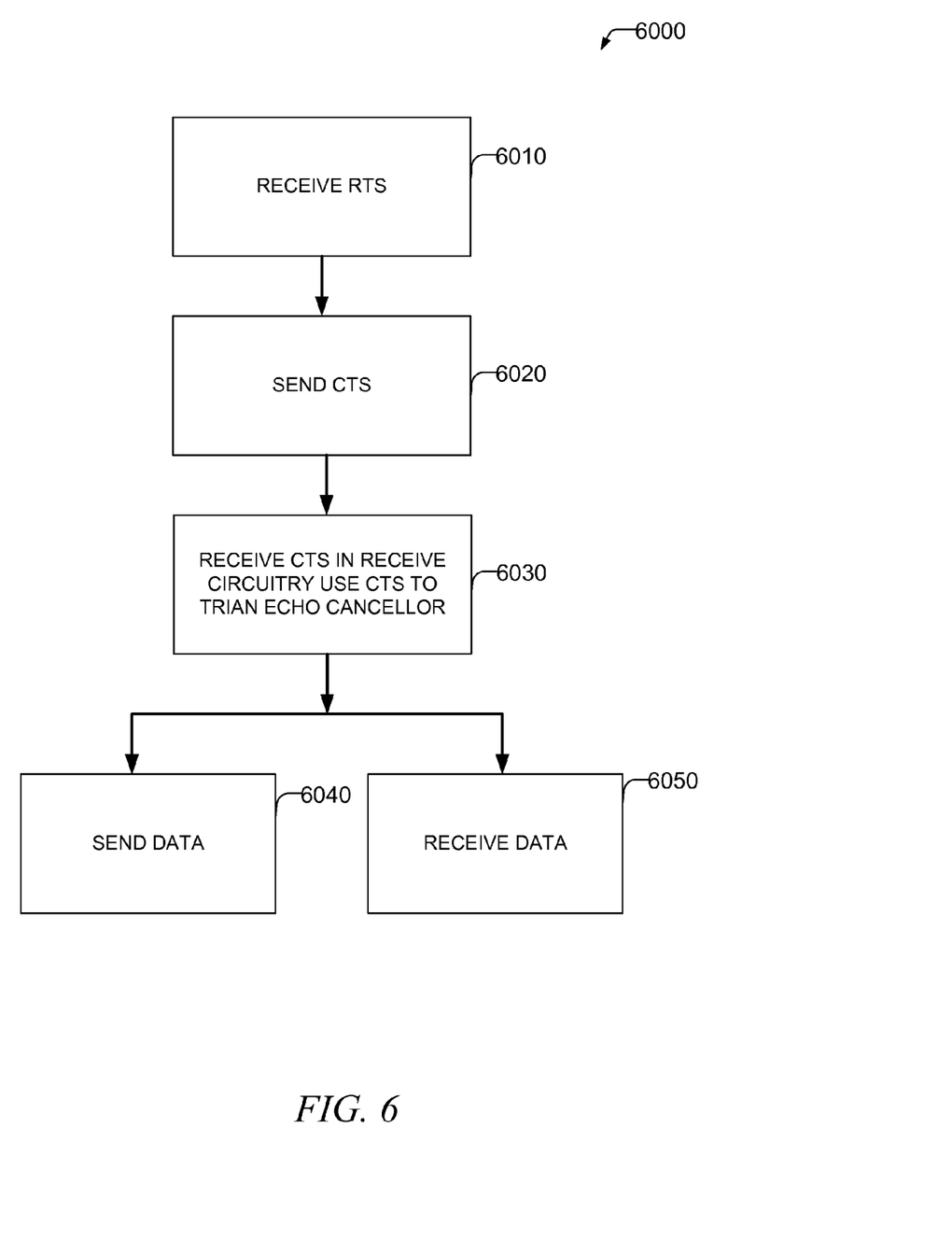
FIG. 6 shows a flowchart of a method of full-duplex communication performed by a responder device according to some examples of the present disclosure.

FIG. 6 shows a flowchart of a method of full-duplex communication 6000 performed by a responder device according to some examples of the present disclosure. At operation 6010 the responder device may receive a RTS message from the initiator device. At operation 6020 the responder device may send back a CTS message. At operation 6030 the CTS message, as heard by the receive circuitry of the responding device, may be utilized to train the echo canceller in the receive circuitry so the echo canceller may effectively cancel out the contributions of any transmissions of its transmission circuitry to any received signals. Sending data 6040 and receiving data 6050 may then happen concurrently while the transmission opportunity defined by the RTS message is still active. In some examples, the responder device may delay sending data 6040 until it receives the first data from the initiating device. This may ensure that the CTS message from the responding device was properly received by the initiating device.

Figure 7:
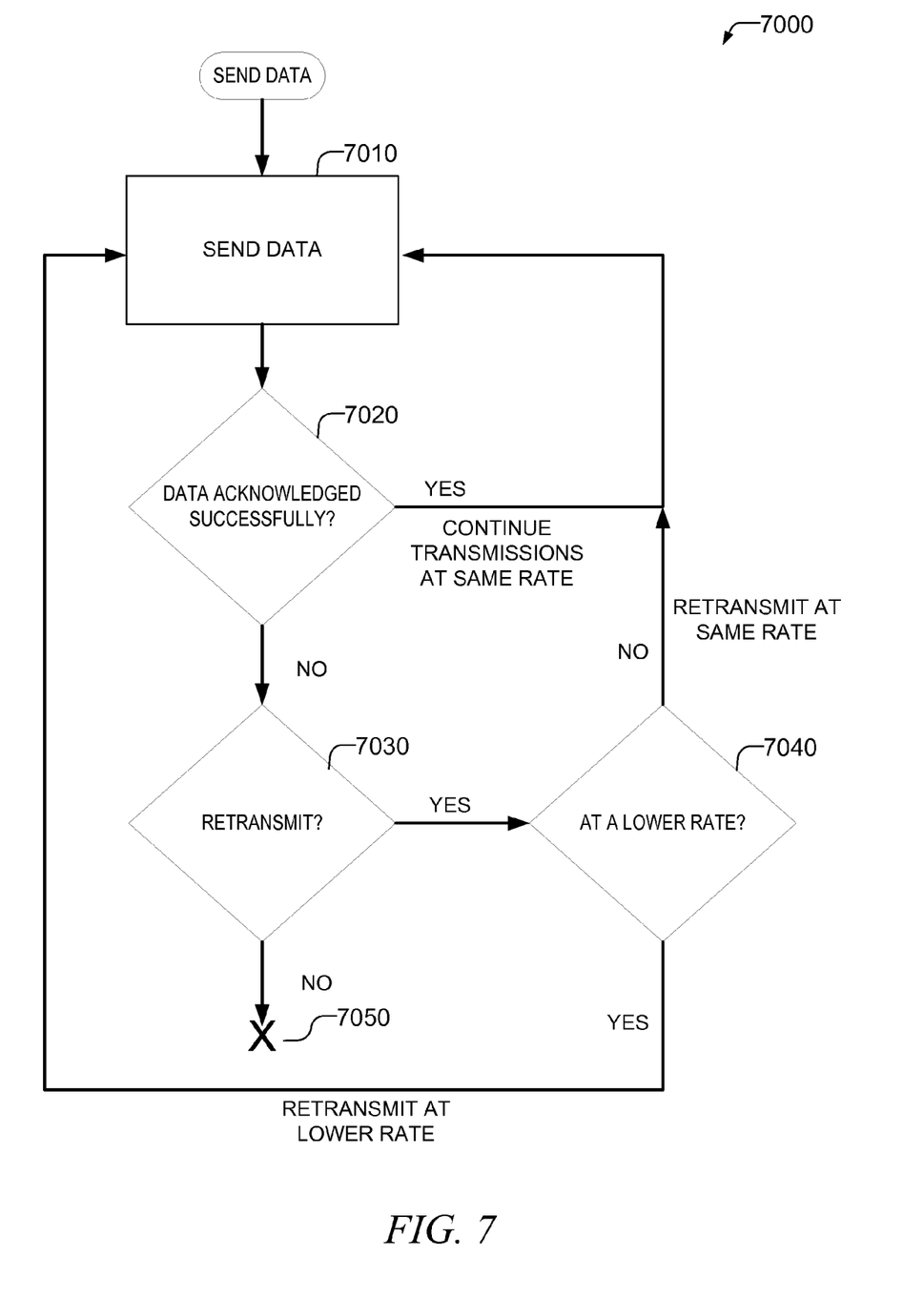
FIG. 7 shows a flowchart of a method of full-duplex transmission performed by a responder device, an initiating device, or both according to some examples of the present disclosure.

FIG. 7 shows a flowchart of a method of full-duplex transmission 7000 performed by a responding device, an initiating device, or both (e.g., 5040 and 6040 from FIGS. 5 and 6) according to some examples of the present disclosure. At operation 7010 the device may send data to the other device. At operation 7020 the device may determine, based upon acknowledgements received from the other device, whether the data sent was acknowledged successfully. In some examples, this may be a per-packet acknowledgement, but in other examples, this may be a block acknowledgement which indicates a reception status for a group of packets. If the data that has been sent has been successfully acknowledged, the device may continue to send data at operation 7010 until the tx-op is complete. If one or more of the data packets set at operation 7010 was either not acknowledged as expected or was acknowledged with a negative acknowledgement, the device may determine whether to retransmit the packets at operation 7030. In some examples, the device may not retransmit the failed packets and may stop transmitting new packets at operation 7050 (with the exception of acknowledgements for received packets—which may or may not be done simultaneously with receiving new packets). If the failed packets are to be retransmitted, the system may determine whether to retransmit them at a lower rate at operation 7040. For example, if only a few packets had errors, the system may decide to retransmit them at the same rate at operation 7010. If enough packets have errors, the system may retransmit them at a lower rate—e.g., by using a more robust MCS at operation 7010.

Figure 8:
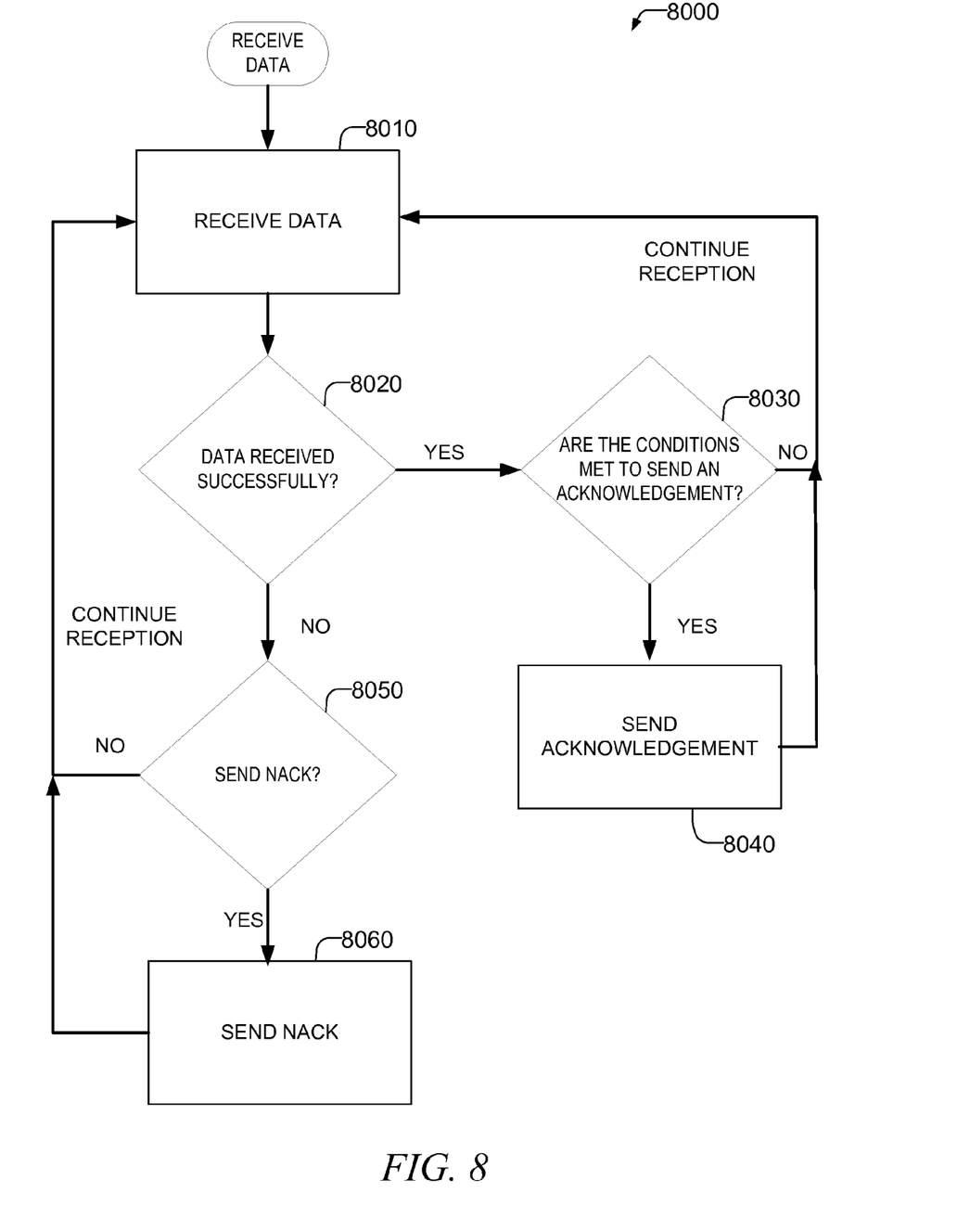
FIG. 8 shows a flowchart of a method of full-duplex reception performed by a responding device, an initiating device, or both according to some examples of the present disclosure.

FIG. 8 shows a flowchart of a method of full-duplex reception 8000 performed by a responding device, an initiating device, or both (e.g., operations 5050 and 6050 from FIGS. 5 and 6) according to some examples of the present disclosure. The operations of FIG. 7 and FIG. 8 may be performed simultaneously (or near simultaneously) by both the initiating and responding devices. At operation 8010 the device may receive data sent by another wireless device. At operation 8020 if the data was received successfully, the device may determine at operation 8030 whether the conditions are met to send an acknowledgement. For example, if block acknowledgements are not used the device may immediately send an acknowledgement at operation 8040. In other examples, if block acknowledgements are used, and if the conditions for sending a block acknowledgement have been satisfied (e.g., enough packets have been successfully received, enough time has passed, or the like), the device may send a block acknowledgement at operation 8040. If an acknowledgement is not to be sent, the device may continue receiving data at operation 8010 until the tx-op is over.

If the data was not received successfully, at operation 8050 the device determines whether to send a negative acknowledgement (NACK) or not. For example, based upon the configuration of the device or the network, the device may or may not send a negative acknowledgement at operation 8060. Once a NACK has been sent, the device may continue receiving data at operation 8010. While in some examples a NACK is sent, in other examples, a block acknowledgement may also signal a packet failure by indicating a sequence number of the last successfully received packet that is prior to the sequence number of the packet received in error.

Figure 9:
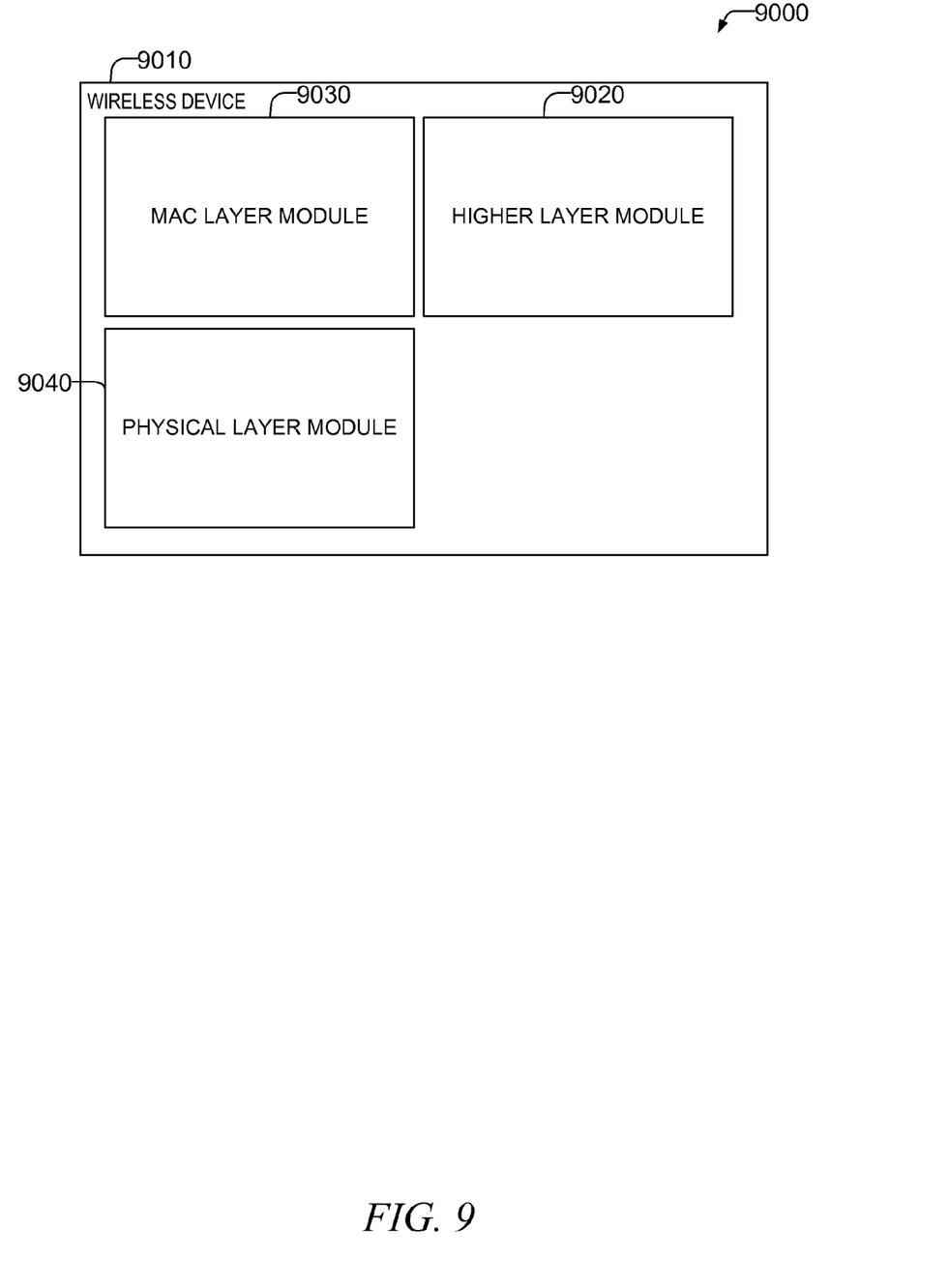
FIG. 9 shows a schematic of an example wireless device which is capable of full-duplex communication according to some examples of the present disclosure.

FIG. 9 shows a schematic of an example wireless device 9010 (e.g., a STA or an AP) which is capable of full-duplex communication according to some examples of the present disclosure. The components of FIG. 9 may be implemented in any combination of hardware, software, and/or firmware. The device 9010 may be any wireless device capable of full-duplex communication with any other wireless device. Wireless devices 9010 may take on a role as an access point (AP), a station (STA), or the like. Example wireless devices 9010 may include any computing device capable of wireless communication. Examples include desktops, laptops, smartphones, cellular phones, tablets, and the like. The device 9010 may include a higher layer module 9020. The higher layer module 9020 may include various protocol layers of a protocol stack, such as an Open Systems Interconnection model (OSI) protocol stack or a similar stack. For example, the higher layer module 9020 may implement one or more data link layer protocols (e.g., a logical link control), network layer protocols (e.g., internet protocol (IP)), transport layer protocols (e.g., transmission control protocol (TCP)), session layer protocols, presentation layer protocols, and application layer protocols (e.g., a file transfer protocol (FTP), a hypertext transfer protocol (HTTP)). The higher layer module 9020 may pass data to send to another wireless device to a MAC layer module 9030 in the form of a MAC Service Data Unit (MSDU). The higher layer module 9020 may receive data from other devices through the MAC layer module 9030 in the form of a MSDU.

The MAC layer module 9020 may provide, among other things, addressing and channel access control implemented according to an 802.11 family of wireless standards. The MAC layer may receive the MSDU from the higher layer module 9020 and deliver the data to a physical layer module 9040 in the form of a Physical Service Data Unit (PSDU). The MAC layer may receive data from other devices through the physical layer module 9040 in the form of Physical Service Data Unit (PSDU). The term protocol as used herein may be the means by which entities in the layered protocol model exchange data and control information with other layers and with their peer entities on other devices. This exchange may take place through protocol data units (PDUs). For example, the MAC layer module 9030 of device 9010 may communicate with another MAC layer module of another wireless device through an exchange of MAC PDUs (MPDUs). The physical (PHY) layer module 9040 may communicate with another PHY layer module in another wireless device through a Physical PDU (PPDU).

The MAC layer module 9030 may cause the PHY layer module 9040 to transmit a RTS message, a CTS message, user data, acknowledgements, block acknowledgements, negative acknowledgements, and the like to one or more other devices. For example, the MAC layer module 9030 may implement the methods shown in FIGS. 5-8. The MAC layer module 9030 may determine when to send a CTS message, and an RTS message (e.g., based upon a need to send data to another device), and may determine when to send an acknowledgement or block acknowledgement. The MAC layer may determine whether and to what extent communications will be full-duplex or half-duplex, and will control the use of RTS and CTS to train the echo canceller. The MAC layer may also determine when to begin and end simultaneous transmission and reception.

The physical layer module 9040 may provide wireless transmission mechanisms for the MAC layer module 9030 through the scrambling, coding, interleaving, symbol mapping and modulation as well as through measurements of the wireless medium and subsequent reporting of those measurements to the MAC layer. The physical layer module 9040 may include or control an echo canceller circuitry which may be signaled by the MAC layer module 9030 that an RTS or CTS is to be used to train the echo canceller.

Figure 10:
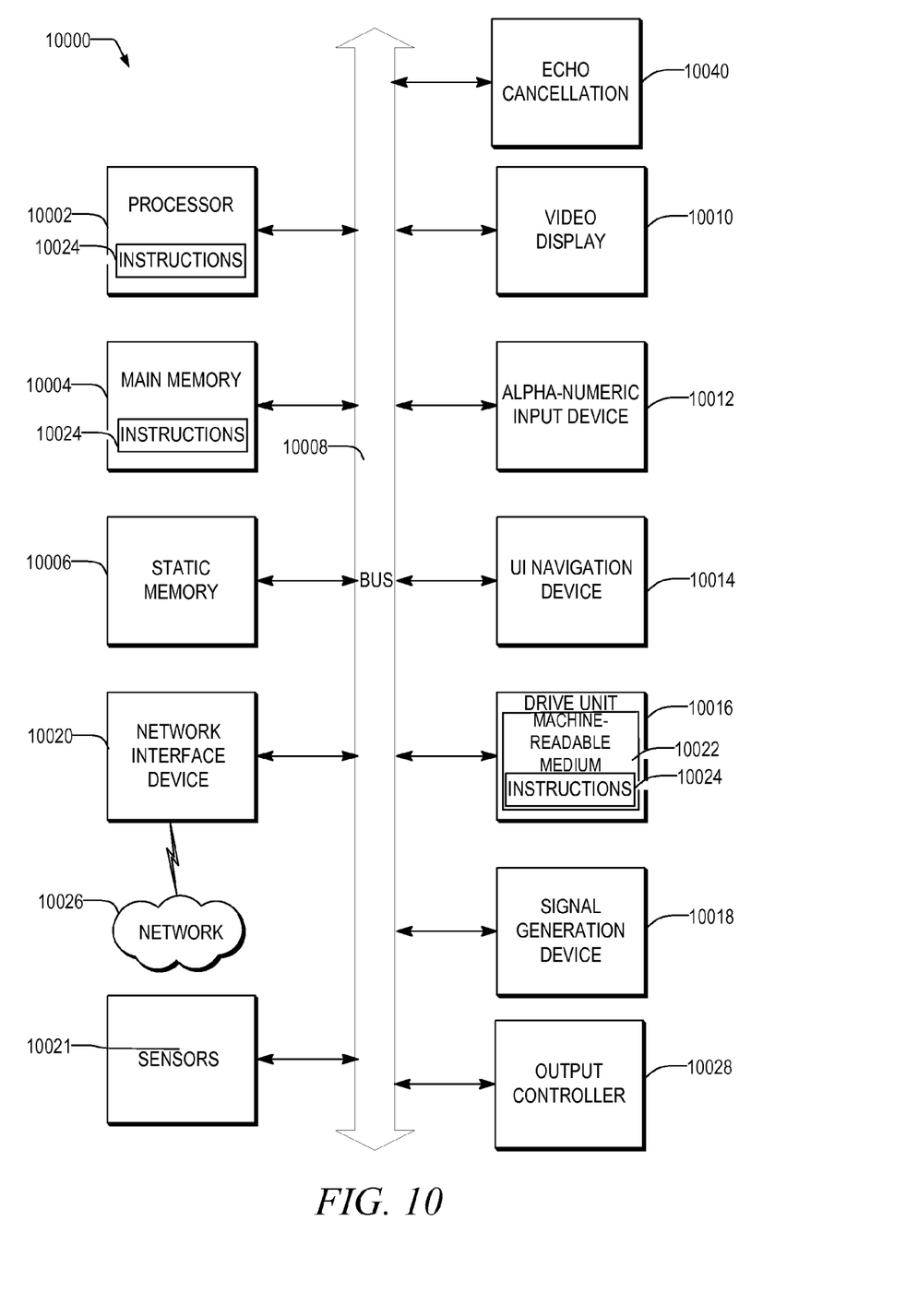
FIG. 10 is a block diagram illustrating an example of a machine upon which one or more embodiments may be implemented according to some examples of the present disclosure.

FIG. 10 illustrates a block diagram of an example machine 10000 upon which any one or more of the techniques (e.g., methodologies) discussed herein may be performed. In alternative embodiments, the machine 10000 may operate as a standalone device or may be connected (e.g., networked) to other machines. In a networked deployment, the machine 10000 may operate in the capacity of a server machine, a client machine, or both in server-client network environments. In an example, the machine 1000 may act as a peer machine in peer-to-peer (P2P) (or other distributed) network environment. The machine 10000 may be an access point (AP), a station (STA), a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the machine 10000 may be configured to include the components of FIG. 9. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 10000 may include a hardware processor 10002 (e.g., a central processing unit (CPU), a graphics processing unit (GPU), a hardware processor core, or any combination thereof), a main memory 10004 and a static memory 10006, some or all of which may communicate with each other via an interlink (e.g., bus) 10008. The machine 10000 may further include a display unit 10010, an alphanumeric input device 10012 (e.g., a keyboard), and a user interface (UI) navigation device 10014 (e.g., a mouse). In an example, the display unit 10010, input device 10012 and UI navigation device 10014 may be a touch screen display. The machine 10000 may additionally include a storage device (e.g., drive unit) 10016, a signal generation device 10018 (e.g., a speaker), a network interface device 10020, and one or more sensors 10021, such as a global positioning system (GPS) sensor, compass, accelerometer, or other sensor. The machine 10000 may include an output controller 10028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 10016 may include a machine readable medium 10022 on which is stored one or more sets of data structures or instructions 10024 (e.g., software) embodying or utilized by any one or more of the techniques or functions described herein. The instructions 10024 may also reside, completely or at least partially, within the main memory 10004, within static memory 10006, or within the hardware processor 10002 during execution thereof by the machine 10000. In an example, one or any combination of the hardware processor 10002, the main memory 10004, the static memory 10006, or the storage device 10016 may constitute machine readable media.

While the machine readable medium 10022 is illustrated as a single medium, the term "machine readable medium" may include a single medium or multiple media (e.g., a centralized or distributed database, and/or associated caches and servers) configured to store the one or more instructions 10024.

The term "machine readable medium" may include any medium that is capable of storing, encoding, or carrying instructions for execution by the machine 10000 and that cause the machine 10000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 10024 may further be transmitted or received over a communications network 10026 using a transmission medium via the network interface device 10020. The Machine 10000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 10020 may include one or more physical jacks (e.g., Ethernet, coaxial, or phone jacks) or one or more antennas to connect to the communications network 10026. In an example, the network interface device 10020 may include a plurality of antennas to wirelessly communicate using at least one of single-input multiple-output (SIMO), multiple-input multiple-output (MIMO), or multiple-input single-output (MISO) techniques. In some examples, the network interface device 10020 may wirelessly communicate using Multiple User MIMO techniques. The machine 10000 may also include echo cancellation circuitry 10040.

OTHER NOTES AND EXAMPLES

Example 1 includes subject matter (such as a method, means for performing acts, machine readable medium including instructions that, when performed by a machine cause the machine to perform acts, or an apparatus configured to perform) full duplex wireless transmission performed by a wireless device, comprising: sending a wireless medium reservation message addressed to a second wireless device on a first wireless channel; receiving the wireless medium reservation message; utilizing the received wireless medium reservation message to train echo cancellation circuitry; receiving a confirmation message from the second wireless device, the confirmation message confirming receipt of the wireless medium reservation message by the second wireless device; responsive to receiving the confirmation message, simultaneously transmitting data to the second wireless device and receiving data from the second wireless device on the first wireless channel by reducing interference from transmissions of the wireless device using the echo cancellation circuitry.

In example 2, the subject matter of example 1 may optionally include wherein the wireless medium reservation message is a Request To Send (RTS) message formatted in accordance with an 802.11 family of wireless standards.

In example 3, the subject matter of any one or more of examples 1-2 may optionally include wherein the confirmation message is a Clear To Send (CTS) message formatted in accordance with an 802.11 family of wireless standards.

In example 4, the subject matter of any one or more of examples 1-3 may optionally include wherein transmitting data to the second wireless device comprises sending a block acknowledgement for data received from the second wireless device on the first wireless channel.

In example 5, the subject matter of any one or more of examples 1-4 may optionally include wherein receiving data from the second wireless device comprises receiving a negative acknowledgement (NACK) message from the second wireless device, the NACK message reporting an error in receiving the transmitted data transmitted by the wireless device to the second wireless device; and wherein the method further comprises: responsive to receiving the NACK, resending the transmitted data at a Modulation and Coding Scheme (MCS) which is more tolerant of errors than a previous MCS used to send the transmitted data.

In example 6, the subject matter of any one or more of examples 1-5 may optionally include wherein receiving data from the second wireless device comprises receiving a negative acknowledgement (NACK) message from the second wireless device, the NACK message reporting an error in receiving the transmitted data transmitted by the wireless device to the second wireless device; and wherein the method further comprises: responsive to receiving the NACK, transmitting only acknowledgements to the second wireless device in a current transmission opportunity and refraining from transmitting user data to the second wireless device in the current transmission opportunity.

In example 7, the subject matter of any one or more of examples 1-6 may optionally include wherein received data is not received from the second wireless device until after a first user data packet is received at the second wireless device.

In example 8, the subject matter of any one or more of examples 1-7 may optionally include wherein the first and second wireless devices operate in accordance with an 802.11 family of standards.

In example 9, the subject matter of any one or more of examples 1-8 may optionally include wherein the wireless device is an access point (AP) and the second wireless device is a station (STA).

In example 10, the subject matter of any one or more of examples 1-9 may optionally include wherein the wireless device is a station (STA) and the second wireless device is an access point (AP).

Example 11 includes or may optionally be combined with the subject matter of any one of examples 1-10 to include subject matter (such as a device, apparatus, or machine) comprising: 1. A wireless device comprising a memory and a processor coupled to the memory and configured to include: a Medium Access Control (MAC) module configured to: send a wireless medium reservation message addressed to a second wireless device on a first wireless channel; receive the wireless medium reservation message; utilize the received wireless medium reservation message to train echo cancellation circuitry; receive a confirmation message from the second wireless device, the confirmation message confirming receipt of the wireless medium reservation message by the second wireless device; responsive to receiving the confirmation message, simultaneously cause a physical layer module to transmit data to the second wireless device and receive data from the second wireless device on the first wireless channel by reducing interference from transmissions of the wireless device using the echo cancellation circuitry.

In example 12, the subject matter of any one or more of examples 1-11 may optionally include wherein the wireless medium reservation message is a Request To Send (RTS) message formatted in accordance with an 802.11 family of wireless standards.

In example 13, the subject matter of any one or more of examples 1-12 may optionally include wherein the confirmation message is a Clear To Send (CTS) message formatted in accordance with an 802.11 family of wireless standards.

In example 14, the subject matter of any one or more of examples 1-13 may optionally include wherein transmitting data to the second wireless device comprises sending a block acknowledgement for data received from the second wireless device on the first wireless channel.

In example 15, the subject matter of any one or more of examples 1-14 may optionally include wherein receiving data from the second wireless device comprises receiving a negative acknowledgement (NACK) message from the second wireless device, the NACK message reporting an error in receiving the transmitted data transmitted by the wireless device to the second wireless device; and wherein the method further comprises: responsive to receiving the NACK, resending the transmitted data at a Modulation and Coding Scheme (MCS) which is more tolerant of errors than a previous MCS used to send the transmitted data.

In example 16, the subject matter of any one or more of examples 1-15 may optionally include wherein receiving data from the second wireless device comprises receiving a negative acknowledgement (NACK) message from the second wireless device, the NACK message reporting an error in receiving the transmitted data transmitted by the wireless device to the second wireless device; and wherein the method further comprises: responsive to receiving the NACK, transmitting only acknowledgements to the second wireless device in a current transmission opportunity and refraining from transmitting user data to the second wireless device in the current transmission opportunity.

In example 17, the subject matter of any one or more of examples 1-16 may optionally include wherein received data is not received from the second wireless device until after a first user data packet is received at the second wireless device.

In example 18, the subject matter of any one or more of examples 1-17 may optionally include wherein the first and second wireless devices operate in accordance with an 802.11 family of standards.

In example 19, the subject matter of any one or more of examples 1-18 may optionally include wherein the wireless device is an access point (AP) and the second wireless device is a station (STA).

In example 20, the subject matter of any one or more of examples 1-19 may optionally include wherein the wireless device is a station (STA) and the second wireless device is an access point (AP).

What is claimed is:

1. A non-transitory machine readable medium for full duplex wireless transmission performed by a wireless device, the machine readable medium including instructions, which when performed the wireless device, configure the wireless device to perform operations comprising:
   sending a wireless medium reservation message addressed to a second wireless device on a first wireless channel;
   receiving the wireless medium reservation message;
   utilizing the received wireless medium reservation message to train echo cancellation circuitry;
   receiving a confirmation message from the second wireless device, the confirmation message confirming receipt of the wireless medium reservation message by the second wireless device;
   responsive to receiving the confirmation message, simultaneously transmitting data to the second wireless device and receiving data from the second wireless device on the first wireless channel by reducing interference from transmissions of the wireless device using the echo cancellation circuitry, wherein the receiving data from the second wireless device comprises receiving a negative acknowledgement (NACK) message from the second wireless device, the NACK message reporting an error in receiving the transmitted data transmitted by the wireless device to the second wireless device; and
   responsive to receiving the NACK, transmitting acknowledgements to the second wireless device in a current transmission opportunity and refraining from transmitting user data to the second wireless device in the current transmission opportunity.

2. The machine readable medium of claim 1, wherein the wireless medium reservation message is a Request To Send (RTS) message formatted in accordance with an 802.11 family of wireless standards.

3. The machine readable medium of claim 1, wherein the confirmation message is a Clear To Send (CTS) message formatted in accordance with an 802.11 family of wireless standards.

4. The machine readable medium of claim 1, wherein the operations of transmitting data to the second wireless device comprises sending a block acknowledgement for data received from the second wireless device on the first wireless channel.

5. The machine readable medium of claim 1, wherein the operations further comprise:
   responsive to receiving the NACK, resending the transmitted data at a Modulation and Coding Scheme (MCS) which is more tolerant of errors than a previous MCS used to send the transmitted data.

6. The machine readable medium of claim 1, wherein received data is not received from the second wireless device until after a first user data packet is received at the second wireless device.

7. The machine readable medium of claim 1, wherein the first and second wireless devices operate in accordance with an 802.11 family of standards.

8. The machine readable medium of claim 1, wherein the wireless device is an access point (AP) and the second wireless device is a station (STA).

9. The machine readable medium of claim 1, wherein the wireless device is a station (STA) and the second wireless device is an access point (AP).

10. A wireless device comprising:
    memory including instructions; and
    processing circuitry, the processing circuitry configured to execute the instructions for medium access control (MAC) operations to configure the wireless device to:
      send a wireless medium reservation message addressed to a second wireless device on a first wireless channel;
      receive the wireless medium reservation message;
      utilize the received wireless medium reservation message to train echo cancellation circuitry;
      receive a confirmation message from the second wireless device, the confirmation message confirming receipt of the wireless medium reservation message by the second wireless device;
      responsive to receiving the confirmation message, simultaneously cause a physical layer module to transmit data to the second wireless device and receive data from the second wireless device on the first wireless channel by using the echo cancellation circuitry to reduce interference from transmissions of the wireless device, wherein the received data from the second wireless device comprises a negative acknowledgement (NACK) message from the second wireless device, the NACK message reporting an error in receiving the transmitted data transmitted by the wireless device to the second wireless device; and responsive to receipt of the NACK, transmit acknowledgements to the second wireless device in a current transmission opportunity and refrain from transmission of user data to the second wireless device in the current transmission opportunity.

11. The wireless device of claim 10, wherein the wireless medium reservation message is a Request To Send (RTS) message formatted in accordance with an 802.11 family of wireless standards.

12. The wireless device of claim 10, wherein the confirmation message is a Clear To Send (CTS) message formatted in accordance with an 802.11 family of wireless standards.

13. The wireless device of claim 10, wherein transmitting data to the second wireless device comprises sending a block acknowledgement for data received from the second wireless device on the first wireless channel.

14. The wireless device of claim 10, wherein responsive to receipt of the NACK, the wireless device is configured to resend the transmitted data at a Modulation and Coding Scheme (MCS) which is more tolerant of errors than a previous MCS used to send the transmitted data.

15. The wireless device of claim 10, wherein received data is not received from the second wireless device until after a first user data packet is received at the second wireless device.

16. The wireless device of claim 10, wherein the first and second wireless devices operate in accordance with an 802.11 family of standards.

17. The wireless device of claim 10, wherein the wireless device is an access point (AP) and the second wireless device is a station (STA).

18. The wireless device of claim 10, wherein the wireless device is a station (STA) and the second wireless device is an access point (AP).

19. A method for full duplex wireless transmission performed by a wireless device, the method comprising:

sending a wireless medium reservation message addressed to a second wireless device on a first wireless channel;

receiving the wireless medium reservation message;

utilizing the received wireless medium reservation message to train echo cancellation circuitry;

receiving a confirmation message from the second wireless device, the confirmation message confirming receipt of the wireless medium reservation message by the second wireless device;

responsive to receiving the confirmation message, simultaneously transmitting data to the second wireless device and receiving data from the second wireless device on the first wireless channel by reducing interference from transmissions of the wireless device using the echo cancellation circuitry, wherein the receiving data from the second wireless device comprises receiving a negative acknowledgement (NACK) message from the second wireless device, the NACK message reporting an error in receiving the transmitted data transmitted by the wireless device to the second wireless device; and responsive to receiving the NACK, transmitting acknowledgements to the second wireless device in a current transmission opportunity and refraining from transmitting user data to the second wireless device in the current transmission opportunity.

20. The method of claim 19, wherein the wireless medium reservation message is a Request To Send (RTS) message formatted in accordance with an 802.11 family of wireless standards.

21. The method of claim 20, wherein the confirmation message is a Clear To Send (CTS) message formatted in accordance with an 802.11 family of wireless standards.

22. The method of claim 21, wherein transmitting data to the second wireless device comprises sending a block acknowledgement for data received from the second wireless device on the first wireless channel.

23. The method of claim 22, wherein receiving data from the second and wherein the method further comprises:

responsive to receiving the NACK, resending the transmitted data at a Modulation and Coding Scheme (MCS) which is more tolerant of errors than a previous MCS used to send the transmitted data.

24. A wireless device comprising:

echo cancellation circuitry coupled to one or more antennas;

a transceiver coupled to the echo cancellation circuitry and the one or more antennas;

memory including instructions; and processing circuitry, the processing circuitry configured to execute the instructions for medium access control (MAC) operations to configure the wireless device to:

receive a wireless medium reservation message addressed to the wireless device on a first wireless channel;

send a confirmation message from the second wireless device, the confirmation message confirming receipt of the wireless medium reservation message by the second wireless device;

receive the confirmation message;

train echo cancellation circuitry using the received confirmation message;

responsive to receiving the confirmation message, simultaneously cause a physical layer module to transmit data via the transceiver to the second wireless device and receive data from the second wireless device on the first wireless channel via the transceiver by using the echo cancellation circuitry to reduce interference from transmissions of the wireless device, wherein the received data from the second wireless device comprises a negative acknowledgement (NACK) message from the second wireless device, the NACK message reporting an error in receiving the transmitted data transmitted by the wireless device to the second wireless device; and responsive to receipt of the NACK, transmit acknowledgements to the second wireless device in a current transmission opportunity and refrain from transmission of user data to the second wireless device in the current transmission opportunity.

25. The wireless device of claim 24, wherein the wireless medium reservation message is a Request To Send (RTS) message formatted in accordance with an 802.11 family of wireless standards.

26. The wireless device of claim 24, wherein the confirmation message is a Clear To Send (CTS) message formatted in accordance with an 802.11 family of wireless standards.

27. The wireless device of claim 24, wherein the processor is configured to include an higher layer module configured to implement one of a data link layer protocols, a network layer protocol, a transport layer protocol, a session layer protocol, a presentation layer protocol, and an application layer protocol.

28. The wireless device of claim 24, wherein responsive to receipt of the NACK, the wireless device is configured to resend the transmitted data at a Modulation and Coding Scheme (MCS) which is more tolerant of errors than a previous MCS used to send the transmitted data.

* * * * *